US011800173B1

(12) United States Patent
Kirley

(10) Patent No.: US 11,800,173 B1
(45) Date of Patent: *Oct. 24, 2023

(54) VOICE INTERACTION WITH DIGITAL SIGNAGE USING MOBILE DEVICE

(71) Applicant: Joseph F. Kirley, Bedford, MA (US)

(72) Inventor: Joseph F. Kirley, Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/120,709

(22) Filed: Mar. 13, 2023

Related U.S. Application Data

(63) Continuation of application No. 17/943,707, filed on Sep. 13, 2022, now Pat. No. 11,606,595, which is a continuation of application No. 17/471,975, filed on Sep. 10, 2021, now Pat. No. 11,451,855.

(60) Provisional application No. 63/076,758, filed on Sep. 10, 2020.

(51) Int. Cl.
| H04N 5/445 | (2011.01) |
| H04N 21/422 | (2011.01) |
| H04W 4/80 | (2018.01) |
| G10L 15/26 | (2006.01) |
| H04N 21/472 | (2011.01) |
| G06F 3/147 | (2006.01) |
| G06F 3/16 | (2006.01) |

(52) U.S. Cl.
CPC .......... *H04N 21/422* (2013.01); *G06F 3/147* (2013.01); *G06F 3/167* (2013.01); *G10L 15/26* (2013.01); *H04N 21/472* (2013.01); *H04W 4/80* (2018.02)

(58) Field of Classification Search
CPC .... H04N 21/422; H04N 21/472; G06F 3/147; G06F 3/167; G10L 15/26; H04W 4/80
USPC .............................................. 345/156; 725/40
See application file for complete search history.

(56) References Cited

U.S. PATENT DOCUMENTS

| 10,475,144 | B2* | 11/2019 | Van Hoof | G06Q 90/20 |
| 10,489,824 | B2* | 11/2019 | Vaya | H04W 4/80 |
| 11,037,196 | B2* | 6/2021 | Fernandez | H04W 4/021 |
| 2014/0085179 | A1* | 3/2014 | Krig | G06F 3/14 |
| | | | | 345/156 |
| 2014/0188619 | A1* | 7/2014 | Ravindran | H04H 60/92 |
| | | | | 705/14.64 |
| 2015/0046953 | A1* | 2/2015 | Davidson | H04N 21/44008 |
| | | | | 725/74 |
| 2017/0277268 | A1* | 9/2017 | Ono | G06F 16/00 |
| 2017/0277500 | A1* | 9/2017 | Ono | G06Q 30/02 |
| 2018/0032291 | A1* | 2/2018 | Goto | H04W 76/10 |
| 2019/0295526 | A1* | 9/2019 | Ichikawa | B25J 11/0005 |
| 2019/0379740 | A1* | 12/2019 | Clopp | H04L 41/22 |
| 2020/0233680 | A1* | 7/2020 | Ma | G06F 16/248 |
| 2021/0295367 | A1* | 9/2021 | Wald | G06Q 20/3224 |
| 2021/0344991 | A1* | 11/2021 | Todd | H04N 21/4438 |

* cited by examiner

*Primary Examiner* — Jefferey F Harold
*Assistant Examiner* — Sahar Aqil Riaz
(74) *Attorney, Agent, or Firm* — Nutter McClennen & Fish LLP

(57) ABSTRACT

A digital signage system allows a person to use the person's own mobile device as a voice input device to the digital signage system and also can leverage the person's mobile device in other ways such as by accepting other inputs from the mobile device, providing various outputs to the mobile device, or utilizing communication capabilities of the mobile device.

39 Claims, 4 Drawing Sheets

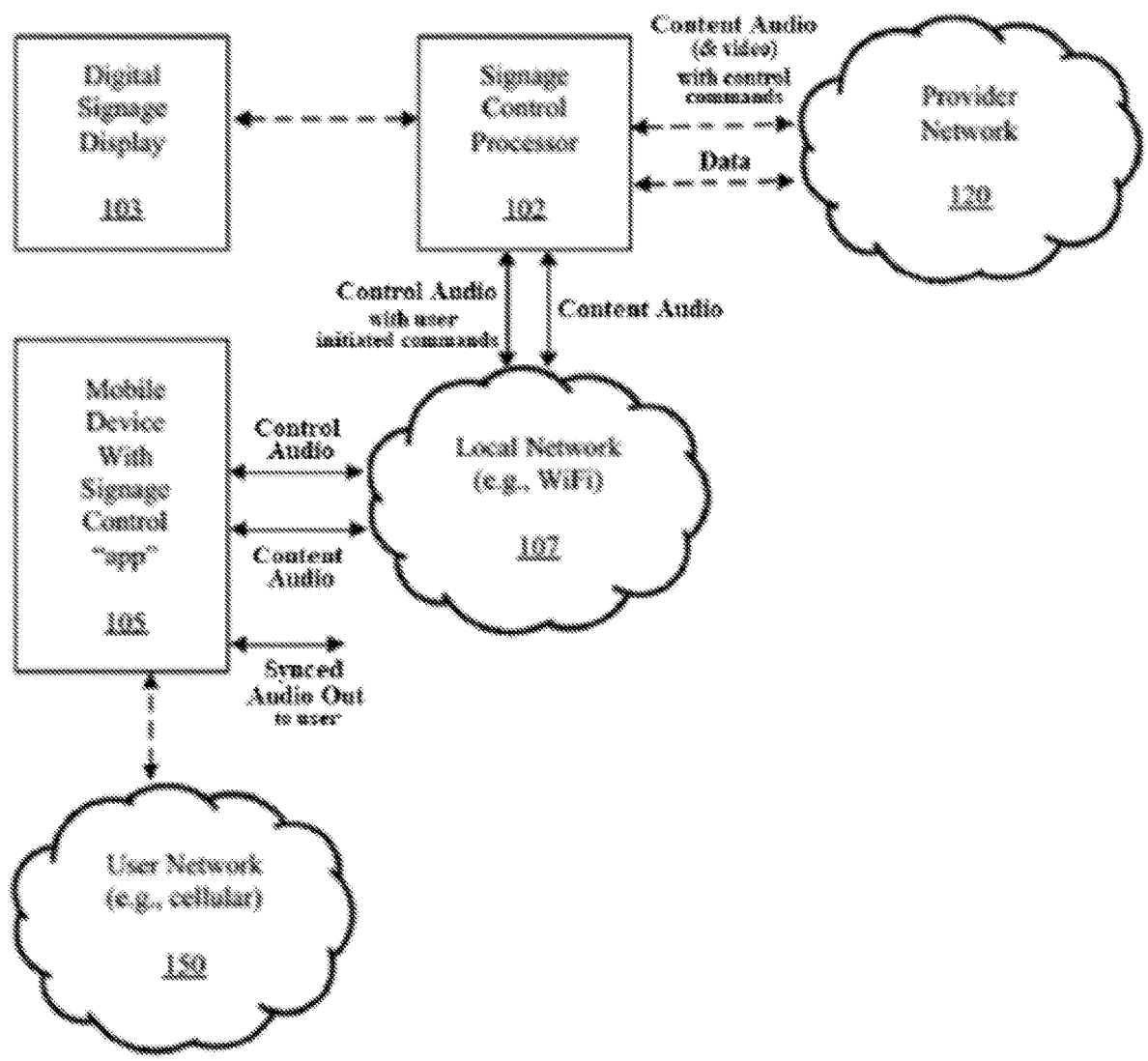
FIG. 4    400

VOICE INTERACTION WITH DIGITAL SIGNAGE USING MOBILE DEVICE

TECHNICAL FIELD

This patent application is a continuation of U.S. patent application Ser. No. 17/943,707 entitled VOICE INTERACTION WITH DIGITAL SIGNAGE USING MOBILE DEVICE filed Sep. 13, 2022 issuing as U.S. Pat. No. 11,606,595 on Mar. 14, 2023, which is a continuation of U.S. patent application Ser. No. 17/471,975 entitled VOICE INTERACTION WITH DIGITAL SIGNAGE USING MOBILE DEVICE filed Sep. 10, 2021, issued as U.S. Pat. No. 11,451,855 on Sep. 20, 2022, which claims the benefit of U.S. Provisional Patent Application No. 63/076,758 entitled VOICE INTERACTION WITH DIGITAL SIGNAGE USING MOBILE DEVICE filed Sep. 10, 2020, each of which is hereby incorporated herein by reference in its entirety.

TECHNICAL FIELD

The present invention relates to voice interaction with digital signage systems, and other video display systems, using mobile devices.

BACKGROUND ART

Digital signage has been growing as an industry and as a way for companies or other entities to better interact with people. Far from being just "dumb" display devices as in the past, modern digital signage often includes advanced features. Interactive features are considered essential for many digital signage applications. For example, some digital signage includes touchscreen input, although, particularly in view of the Covid 19 pandemic, people are generally trying to avoid touching things in public and so touchscreen input is generally considered to be a declining feature of digital signage. Some digital signage includes voice input through microphone arrays and audio output through speakers, although this type of voice/audio interactivity can be very expensive to install and suffers from issues common to public areas such as lack of privacy, ambient noise, and voice interference problems as well as the generation of unwanted audio. Some digital signage includes network connectivity through wired and wireless connections and intelligent processing through which interactions with digital signage can be customized based on a person's identity, although most systems do not include such intelligence.

SUMMARY OF VARIOUS EMBODIMENTS

In accordance with one embodiment, a method for interaction with a digital signage system using a mobile device includes establishing one or more wireless communication connections between a signage control application running on the mobile device and a signage control processor of the digital signage system; displaying, by the digital signage system, video information on the digital signage display for interaction by a user; transmitting, by the signage control processor to the signage control application running on the mobile device, over a wireless communication connection, audio information associated with the video information for rendering through an audio output of the mobile device; rendering the audio information by the signage control application running on the mobile device through an audio output of the mobile device in a manner that substantially synchronizes the rendered audio information with the displayed video information; capturing, by the signage control application, user voice signals from a microphone of the mobile device; transmitting, by the signage control application to the signage control processor, voice control information based on the user voice signals; determining, by the digital signage system, a user voice control command based on the voice control information (e.g., a voice-based query, a voice-based selection of an item displayed on the digital signage display, voice-based navigation of information displayed on the digital signage display, etc.); and controlling operation of the digital signage system based on the user voice control command and the video information displayed on the digital signage display, wherein the user voice control command is substantially synchronized with the video information being displayed on the digital signage display.

In accordance with another embodiment, a digital signage system with interaction from a mobile device includes a digital signage display and at least one processor including a signage control processor coupled to at least one memory containing instructions executable by the at least one processor to cause the system to establish one or more wireless communication connections between the signage control processor and a signage control application running on a user mobile device; display video information on the digital signage display for interaction by a user; transmit, by the signage control processor to the signage control application running on the mobile device, over a wireless communication connection, audio information associated with the video information for rendering through an audio output of the mobile device; render the audio information by the signage control application running on the mobile device through an audio output of the mobile device in a manner that substantially synchronizes the rendered audio information with the displayed video information; receive, by the signage control processor, from the signage control application, voice control information based on user voice signals captured by the signage control application from a microphone of the mobile device; determine a user voice control command based on the voice control information (e.g., a voice-based query, a voice-based selection of an item displayed on the digital signage display, voice-based navigation of information displayed on the digital signage display, etc.); and control operation of the digital signage system based on the user voice control command and the video information displayed on the digital signage display, wherein the user voice control command is substantially synchronized with the video information being displayed on the digital signage display.

In various alternative embodiments, the video information displayed on the digital signage display may be delayed relative to corresponding audio information by a predetermined amount of delay greater than or equal to an amount of delay added to the audio information by the wireless communication connection so that the audio information is received by the signage control application at or before the corresponding video information is displayed on the display device, in which case the signage control app running on the mobile device may add delay to the audio information if needed to substantially synchronize the rendered audio information with the delayed video information being displayed on the digital signage display.

Additionally or alternatively, the one or more communication connections may be automatically established when the mobile device running the signage control application is in communicative proximity with the signage control processor or may be established manually by the user, e.g., by selecting from a list of available systems presented through the signage control application. In any case, multiple communication connection channels may be established between the signage control application running on the user mobile device and the signage control processor to carry different types of traffic.

Additionally or alternatively, the signage control processor may display the information on the digital signage display or the information may be displayed by a processor separate from the signage control processor. The signage control application running on the mobile device may perform voice recognition on the user voice signals to interpret the user voice signals in which case the voice control information transmitted by the signage control application may include non-voice data representative of the interpreted user voice signals (e.g., voice-to-text data), or the signage control processor may perform voice recognition on the voice control information.

For additional control of the digital signage system from the user's mobile device, the signage control application running on the mobile device may receive a non-voice user input relating to the information displayed on the digital signage display (e.g., a motion input or a mobile device touchscreen input) and may transmit non-voice user input information to the signage control processor based on the non-voice user input. Similarly, the signage control processor may transmit to the signage control application running on the mobile device non-audio output information relating to the information displayed on the digital signage display, e.g., information for display on a display screen of the mobile device. In some embodiments, the signage control process may access Internet connectivity of the mobile device to perform Internet-related processing for at least one of determining the user voice control command or controlling operation of the digital signage system. In some embodiments, signage control processor may monitor the source audio content for triggers and may control the digital signage system based on the triggers.

Additional embodiments may be disclosed and claimed.

BRIEF DESCRIPTION OF THE DRAWINGS

The foregoing features of the invention will be more readily understood by reference to the following detailed description, taken with reference to the accompanying drawings, in which:

FIG. 4 is a schematic diagram describing audio/video synchronization control in accordance with various exemplary embodiments.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions. As used in this description and the accompanying claims, the following terms shall have the meanings indicated, unless the context otherwise requires:

A "mobile device" is a communication device that receives certain signals over a communication network in embodiments of the present invention. A mobile device may be, for example, a cellular phone, smartphone (e.g., iPhone™), personal digital assistant (e.g., Blackberry™), tablet computer, laptop or personal computer, wireless headset (e.g., using an infrared or radio frequency communication link), or other device. Unless the context requires otherwise, references to a specific type of device in exemplary embodiments discussed below (e.g., a phone or smartphone) are not intended to limit an aspect of the present invention to that particular type of device. A mobile device may receive signals over a wireless network (e.g., WiFi, cellular telephone, Bluetooth, etc.), the Internet, and/or other communication network. A mobile device is not necessarily mobile in the sense that it can be stationary at a given time. A mobile device generally includes, among other things, a processor and a tangible non-transitory computer readable medium on which is stored various software programs (e.g., operating system, apps, etc.) that can run on the processor, and also can include various types of input and output devices (e.g., touchscreen display, keyboard, buttons, microphone, speaker, camera, etc.), various types of communication devices (e.g., WiFi, Bluetooth, cellular, headphone jack, USB port, "lightning" port, etc.), and various types of sensors (e.g., GPS, accelerometer, gyroscope, magnetometer, infrared, temperature, ambient light, fingerprint, etc.).

An "app" is a software program that runs in a mobile device in any form and need not be an app that is downloaded from an app store.

Figure 1:
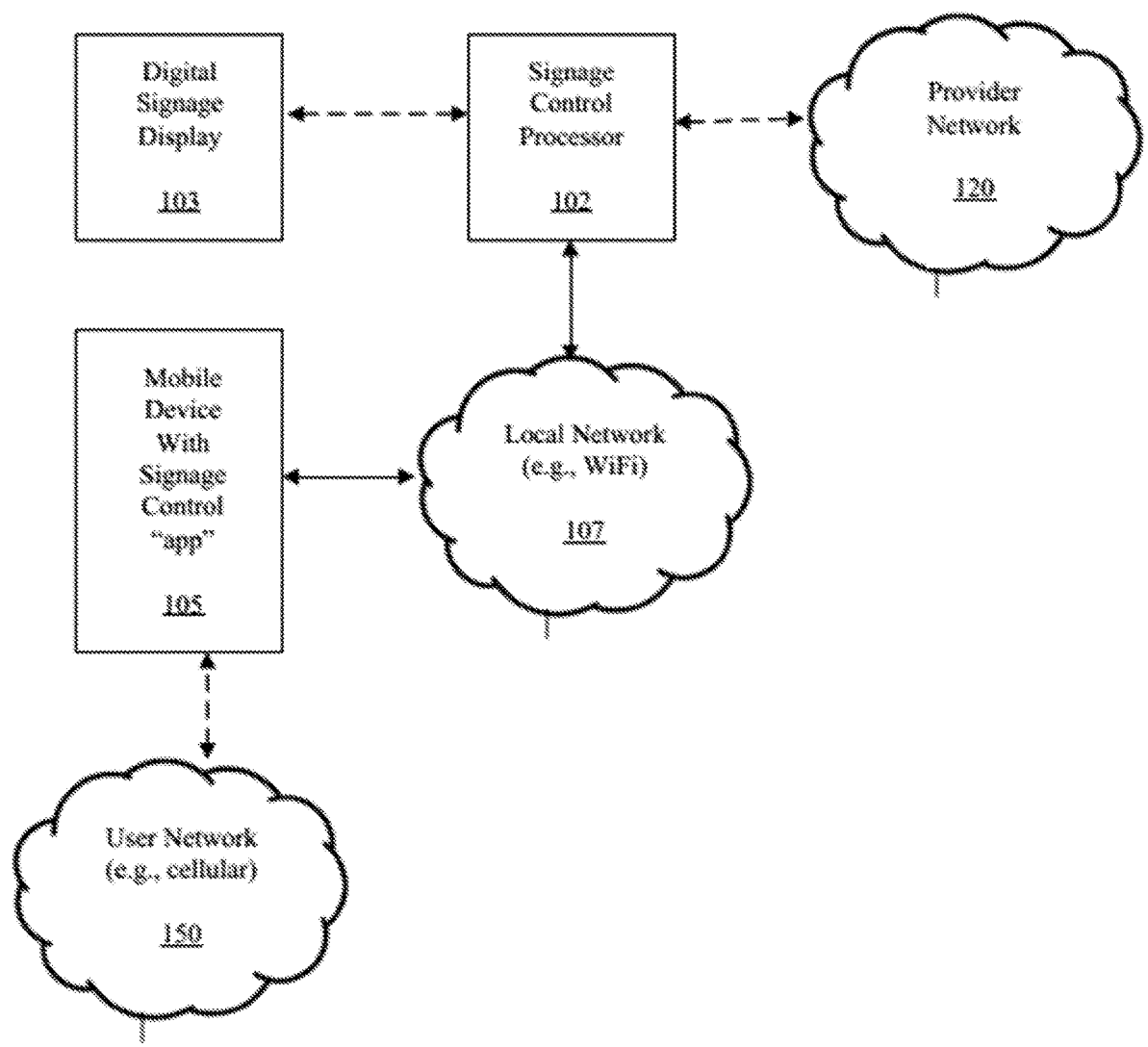
FIG. 1 is a schematic diagram of a digital signage system 100 in accordance with various exemplary embodiments.

In exemplary embodiments, a digital signage system allows a person to use the person's own mobile device as a voice input device to the digital signage system and also can leverage the person's mobile device in other ways such as by accepting other inputs from the mobile device such as motion-based inputs or inputs from the mobile device touchscreen, providing various outputs to the mobile device such as audio and video outputs and even textual, graphical, or sensory outputs (e.g., activating a tactile or vibrating output on the mobile device such as for signaling a notification or other message or event), or utilizing communication capabilities of the mobile device. The inventor envisions that the avoidance of public touchscreens is likely to persist such that touchless control and interaction with digital signage systems via personal mobile devices is likely to be widely adopted and become a "new normal" for digital signage systems. Various exemplary embodiments are now described with reference to FIG. 1. It should be noted that dashed arrows shown in FIG. 1 represent linkages or connections that may be optional or omitted in various embodiments. Although double-ended arrows are used, communications may be unidirectional in a particular direction or bidirectional in various embodiments.

Among other things, the digital signage system 100 of FIG. 1 includes a signage control processor 102 that is capable of communicating with various types of mobile devices 105 over a local network 107, e.g., using WiFi, Bluetooth, Near Field Communication (NFC), or other communication technology. The mobile communication device 105 typically runs a signage control "app" through which audio information for voice control is transmitted to the signage control processor 102. The mobile device 105 typically includes access to a user network 150 (e.g., WiFi or a cellular communication system that may include Internet access), which, in some embodiments, may be utilized by the signage control processor 102 as discussed below. The mobile device 105 typically also includes various types of input and output devices (e.g., touchscreen display, keyboard, buttons, microphone, speaker, camera, etc.), various types of communication devices (e.g., WiFi, Bluetooth, cellular, headphone jack, USB port, "lightning" port, etc.), and various types of sensors (e.g., GPS, accelerometer, gyroscope, magnetometer, infrared, temperature, ambient light, fingerprint, etc.), which, in some embodiments, may be utilized by the signage control processor 102 as discussed below. In some exemplary embodiments, the signage control processor 102 can display information on a digital signage display 103 (e.g., text, picture, video, graphics, or other information), although the digital signage display 103 may be controlled by a separate processor in some embodiments. The signage control processor 102 may be coupled to a provider network 120 that may include Internet access, e.g., for communication with remote devices.

For voice interaction with the digital signage system via the user's mobile device, the signage control "app" captures audio from the mobile device microphone and transmits it to the signage control processor 102 for processing. Without limitation, voice control commands can include voice-based queries, voice-based selection of items displayed on the digital signage display 103, voice-based navigation of information displayed on the digital signage display 103, or other voice-based inputs. The signage control processor 102 may include voice recognition capabilities in order to interpret the received audio or could send the received audio to a remote processor for interpretation. The mobile device 105 could include voice recognition capabilities in order to interpret the audio or could send the audio to a remote processor for interpretation, in which case the mobile device 105 generally would send data representative of the interpreted audio to the signage control processor 102 (e.g., text corresponding to speech, or identification of a particular selection or action). In any case, the mobile device 105 can be used by the digital signage system 100 as a voice input device, e.g., in lieu of installing a microphone or microphone array. The user's voice can be used in various embodiments to identify the user, e.g., for authentication or for the system to provide user-specific content via the digital signage display and/or the mobile device. Similarly, the system may use other authentication mechanisms to identify the user, e.g., unique mobile device identification numbers or built-in fingerprint identification or facial identification capabilities of the mobile device, which can be accessed by the signage control "app." User identification and other information can be provided by the signage control "app" to the signage control processor 102 for use by the digital signage system.

Figure 2:
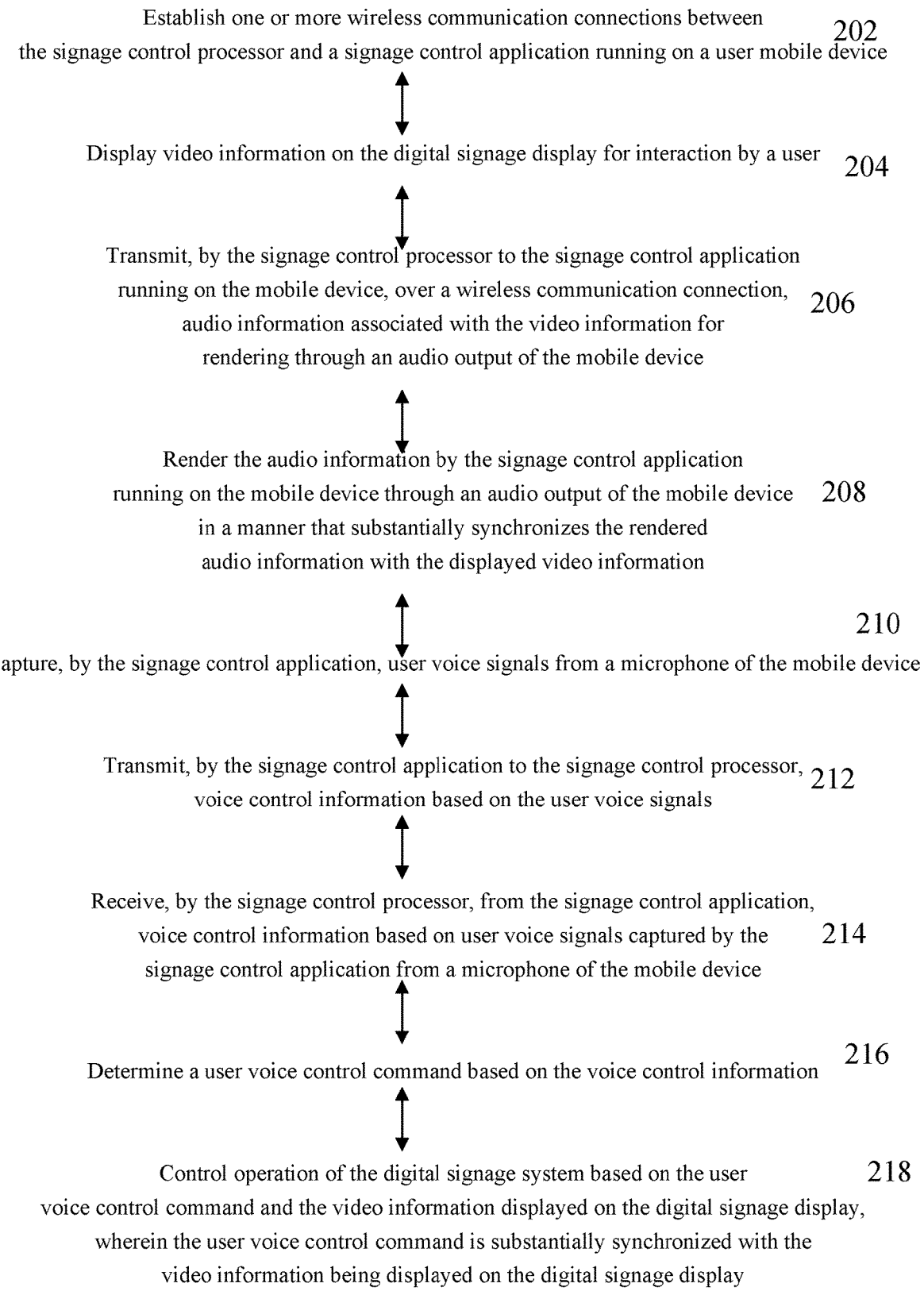
FIG. 2 is a logic flow diagram describing voice-based interaction between a digital signage system and a mobile device in accordance with various exemplary embodiments.

FIG. 2 is a logic flow diagram 200 describing voice-based interaction between a digital signage system and a mobile device in accordance with various exemplary embodiments. Generally speaking, this interaction involves establishing one or more wireless communication connections between a signage control application running on the mobile device and the signage control processor (202); displaying, by the digital signage system, video information on the digital signage display for interaction by a user (204); transmitting, by the signage control processor to the signage control application running on the mobile device, over a wireless communication connection, audio information associated with the video information for rendering through an audio output of the mobile device (206); rendering the audio information by the signage control application running on the mobile device through an audio output of the mobile device in a manner that substantially synchronizes the rendered audio information with the displayed video information (208); capturing, by the signage control application, user voice signals from a microphone of the mobile device (210); transmitting, by the signage control application to the signage control processor, voice control information based on the user voice signals (212); receiving, by the signage control processor, from the signage control application, voice control information based on user voice signals captured by the signage control application from a microphone of the mobile device (214); determining, by the digital signage system, a user voice control command based on the voice control information (216); and controlling operation of the digital signage system based on the user voice control command and the video information displayed on the digital signage display wherein the user voice control command is substantially synchronized with the video information being displayed on the digital signage display (218).

In certain exemplary embodiments, the signage control "app" also could be configured to transmit other types of information from the mobile device to the digital signage system. For example, without limitation, such information could include personal identification information (e.g., through a login, phone number, device identifier, voice identification, fingerprint identification, facial identification, etc.), online activity information (e.g., browser/search history), user inputs and actions for interacting with the digital signage system (e.g., mobile device touchscreen inputs or motion-based inputs for such things as navigating and selecting information presented to the person through the digital signage display 103), location information (e.g., from GPS), etc. In this way, the digital signage system 100 can have access to other types of information in addition to audio information to use for any of a variety of purposes, and the mobile device can be used as an input device for interacting with the digital signage system. This can be particularly valuable when the digital signage system does not have access to online resources from which the system can obtain such additional information, e.g., a digital signage kiosk lacking Internet connectivity.

In certain exemplary embodiments, the signage control processor 102 is configured to transmit audio information back to the mobile device 105. For example, without limitation, the return audio information could include audio from an actual person (e.g., a provider representative who can speak directly with the person through the person's mobile device), audio from an audio or audio/video file, audio from a "chatbot" or other virtual persona such as ALEXA™ or SIRI™, audio from a text-to-speech converter, a text file for the mobile device to convert to audio, etc. The return audio could include private information, e.g., in lieu of displaying private information on the digital signage display 103 or playing the return audio through loudspeakers of the digital signage system, both of which generally would not be considered private, especially if the digital signage display 103 is in a public place. In this way, the mobile device 105 can be used by the digital signage system 100 as an audio output device, e.g., in lieu of installing speakers or in situations where it would be undesirable or inappropriate to play audio out loud such as for conveying personal private information, or when the digital signage system is installed in a "quiet" place such as a library or hospital, or where audio output would be considered as an annoyance for nearby non-users of the digital signage system. The signage control "app" may be configured to output audio to the earpiece speaker of the mobile device 105 so users can listen in a manner similar to listening to a phone call with the mobile device held to the user's ear, e.g., therefore such audio can be heard privately by the mobile device user without using earbuds or headphones. Such audio additionally or alternatively could be accessible through the wired or wireless headphone jack of the mobile device, which generally would be considered another private way to listen to the return audio. The signage control "app" or mobile device could allow the return audio to be played through the mobile device loudspeaker, e.g., at the option of the user when hands-free interaction is desired, although this generally would not be considered private, especially when used in a public place.

In certain exemplary embodiments, the signage control processor 102 is configured to transmit information to the mobile device for display on a mobile device display such as a touchscreen display. For example, without limitation, such information could include a user input screen to allow the user to provide inputs through the mobile device touchscreen (e.g., if the digital signage system does not include its own touchscreen, or so that the user does not have to touch the digital signage system touchscreen, or to enter personal/private information rather than speaking it), a video, a text file, personal or personalized information (e.g., medical information that should not be displayed on the main digital signage screen for privacy reasons, or personal information such as clothing size that could be embarrassing if displayed on the main digital signage screen), personalized advertisements or product offers, etc. In this way, the mobile device can be used as an additional input/output device for the digital signage system.

In certain exemplary embodiments, the digital signage system is configured to utilize the mobile phone's Internet connectivity capabilities to communicate with any of a variety of Internet-connected systems, particularly in situations where the digital signage system does not have its own communication capabilities. For example, without limitation, the digital signage system (e.g., the signage control processor) could use the mobile phone's Internet connectivity capabilities to communicate with a server that can provide information back to the digital signage system (e.g., software updates, dynamically generated content, personalized content, etc.), to send information to a server (e.g., user inputs such as for tracking user behaviors), etc.

In order to support the types of functionality described above, the signage control processor 102 generally establishes one or more communication connections with the mobile device, e.g., using WiFi, Bluetooth, or other wireless communication technology. For example, one or more communication connections could be automatically established when a mobile device outfitted with a signage control "app" is detected by or otherwise in proximity to the signage control processor 102. Additionally or alternatively, one or more communication connections could be established through manual selection by the user, e.g., opening the signage control app when in range of one or more digital signage systems and selecting one of the available digital signage systems (which may be listed for selection by the user). The signage control app may generate an alert to the user (e.g., an audible and/or tactile alert) when a digital signage system is available. In certain exemplary embodiments, multiple communication channels (e.g., WiFi connections/sessions) are established between the signage control processor and the mobile device to carry different types of traffic, particularly when interactions between the mobile device 105 and the signage control processor 102 can include more than just voice input from the mobile device 105 (e.g., to carry other types of information from the mobile device 105 to the signage control processor 102, to carry information from the signage control processor 102 to the mobile device 105, or to perform other functions such as audio synchronization as discussed below). Many digital signage systems already have a processor capable of providing the types of functionality described herein (e.g., with sufficient processing power and communication capabilities), in which case upgrading the digital signage system could be as simple as a software upgrade to the existing processor to convert it into the signage control processor 102, and for those digital signage systems that do not have an existing processor capable of providing the types of functionality described herein, a signage control processor 102 can be easily added to the digital signage system. In typical embodiments, the signage control processor 102 can be an inexpensive computer such as an inexpensive mini-PC computer.

Thus, the inventor envisions a number of ways to leverage existing capabilities of the person's mobile device to enhance digital signage systems. Importantly, the inventor recognized that the person brings all of these capabilities wherever they go by virtue of their mobile device, and leveraging these capabilities allows the digital signage system to be easily enhanced, in many cases with virtually no additional cost to the provider. For example, by using the mobile device microphone and speaker, and optionally also the mobile device touchscreen, the provider could avoid having to install expensive microphone arrays and speakers and could avoid having to install touchscreen displays or upgrade passive displays to touchscreen displays. Also, by utilizing the mobile device's Internet connectivity capabilities, the provider could avoid having to provide Internet connectivity for the digital signage system.

It should be noted that the signage control app may be a "branded" app, e.g., an app from a particular provider that works only with that provider's digital signage, e.g., a specific retailer or a specific establishment. Alternatively, the signage control app may be a generic app that can be used across a number of providers, e.g., allowing the person to move among different retailers or establishments while working with different digital signage providers. It is envisioned that the signage control app can be integrated into the mobile device in other ways, e.g., by integration into the mobile device operating system or into an existing voice control system (e.g., ALEXA™ SIRI™, etc.).

It should be noted that certain exemplary embodiments include synchronization of return audio with video displayed on the digital signage display 103 or on a display of the mobile device 105, for example, using any of various techniques described in U.S. Pat. No. 8,505,054 and in U.S. Pat. No. 10,080,061, each of which is hereby incorporated herein by reference in its entirety. For example, the digital signage system may be configured to delay the video displayed on the digital signage display 103 while transmitting the audio to the mobile device 105 such that audio information is received by the mobile device 105 at or before the time corresponding video information is displayed so that the audio can be output in synchronization with the video, e.g., using automated timing computed by the signage control processor 102 and the mobile device 105, and/or using manual adjustment at the mobile device 105. Such functionality could be provided by the signage control processor 102 itself (e.g., incorporating functionality of an audio/video processor as discussed in U.S. Pat. No. 8,505,054 and in U.S. Pat. No. 10,080,061, e.g., with the signage control processor 102 receiving an audio/video signal, sending at least the audio information of the audio/video signal to the mobile device 105 with the video information delayed before being displayed on the digital signage display 103 or sent to the mobile device 105 for display) or could be provided by a number of "actors" (e.g., an audio/video source sending audio information to the signage control processor 102 to be transferred to the mobile device 105 while delaying the video information before displaying it on the digital signage display 103). In any case, such synchronization can be particularly useful when the audio needs to be "lip sync'ed" with the video.

Accordingly, in certain exemplary embodiments, the signal provided to the display device contains video information that is delayed by a predetermined amount greater than the expected amount of delay that is expected to be encountered by the audio information (e.g., delays due to the communication network over which the audio information is sent, delays due to rendering of the video, etc.) so that the audio is received by the mobile device(s) at or before the video is displayed on the display device. For example, in some embodiments, the expected delay in the communication network may be 5-6 seconds, and therefore the video information may be delayed, for example, by 8-10 seconds before being displayed so that the audio is received by the mobile device(s) prior to display of the video and can be further delayed by the mobile device to synchronize the audio with the video. The signal provided to the display device may include the audio information and/or other information. The amount by which the information provided to the display device (i.e., the video and optionally the corresponding audio and/or other information) is delayed may be fixed or variable/configurable. The app running in the mobile device can provide for adding additional delay to the received audio information so that the audio can be synchronized to the corresponding video on the display device (typically, the amount of delay is continuously variable from zero to some predetermined maximum in some predetermined increment, such as in millisecond increments). The application may allow the user to manually add the delay to the audio, e.g., using various types of controls, and/or the application may automatically add delay to the audio pursuant to various synchronization protocols.

In some exemplary embodiment described above, a fixed amount of delay is added to the video and then a variable amount of delay is added to the audio in order to dynamically synchronize the audio to the video. In certain alternative embodiments, however, a fixed amount of delay may be added to the audio and a variable amount of delay may be added to the video to synchronize the audio and video, or variable amounts of delay may be added to both the video and the audio (e.g., the video delay may be variable and may be set to obtain near-synchronization with the expected delay of the audio signal reaching the mobile devices, with a variable amount of audio delay added by each mobile device to fine-tune synchronization and compensate for timing variations as discussed immediately below). In this regard, the mobile device may send synchronization information to the A/V processor or other device handling the video delay so that such device can delay the video by an amount that synchronizes (or substantially synchronizes) the video with the delayed audio played by the mobile device. For example, the mobile device may be configured to delay the audio by a fixed (or substantially fixed) amount and to convey delay information to the video delay device, or the mobile device may receive audio information with synchronization codes (discussed further below) and convey synchronization code information to the video delay device. The video delay device may receive synchronization information from multiple mobile devices and delay the video to accommodate the mobile devices, e.g., by delaying the video by an amount equal to the average of the mobile device delays or by an amount equal to the greatest of the mobile device delays.

In practice, the amount of delay needed to synchronize the audio to the video may vary over time, for example, based on such things as wireless signal strength, signal interference, varying delays in the transport network (e.g., cell phone network, Internet, etc.), distance from the transmitter, etc. The delay can also be different among users depending on such things as their relative distances from the transmitter and differences in their wireless devices. Thus, certain alternative embodiments of the present invention include provisions for monitoring and matching the relative delays of the audio and video streams automatically over time, with additional adjustments made manually as needed.

In one exemplary embodiment, the application in the mobile device sends "hello" or "ping type messages to the audio content server from time to time (e.g., multiple times per second) and upon receiving responses from the server, measures the round-trip delay and adjusts the amount of audio delay based on the round-trip delay. The round-trip delay is indicative of (but not necessarily equal to) twice the server-to-client network latency. Among other things, this allows the application in each mobile device to adjust the audio delay based on its individual signal reception characteristics.

In another exemplary embodiment, the audio content server may send "hello" or "ping" type messages to the mobile device and upon receiving responses from the mobile device, measures the round-trip delay. In embodiments in which the mobile device adds a variable amount of delay to the audio, the server can report the round-trip delay to the mobile device or provide other information based on the round-trip delay to allow the mobile device to adjust the audio delay. In embodiments in which a variable amount of delay is added to the video signal, the round-trip delay can be used to adjust the video delay to synchronize with the amount of delay added to the audio.

Additionally or alternatively, the separate audio and/or video streams may include time-stamp or other synchronization codes to allow for synchronization of the audio and video, for example, by the mobile device and/or at the display device (e.g., by a set-top box). For example, a separate processing unit that transmits the audio to the mobile devices and adds a fixed delay to the video might include in each audio packet an absolute or relative time at which the audio packet is to be played by the mobile device (e.g., if the current time is 12:00:00 and the video is delayed by 5 seconds, then the timestamp on the corresponding audio packet might be 12:00:05, and, assuming the mobile devices receive the audio packet before 12:00:05, each mobile device would hold the audio packet until 12:00:05 and then play it such that synchronization with the video would be substantially achieved provided that the mobile devices are substantially synchronized with the processing unit, e.g., based on a common reference clock such as those available from the Internet or from cellular phone networks). Generally speaking, the time-stamping would need to be sufficiently granular for specifying fractions of a second (e.g., milliseconds). Similar time-stamping could be added to the audio and/or video streams by the content provider.

Figure 3:
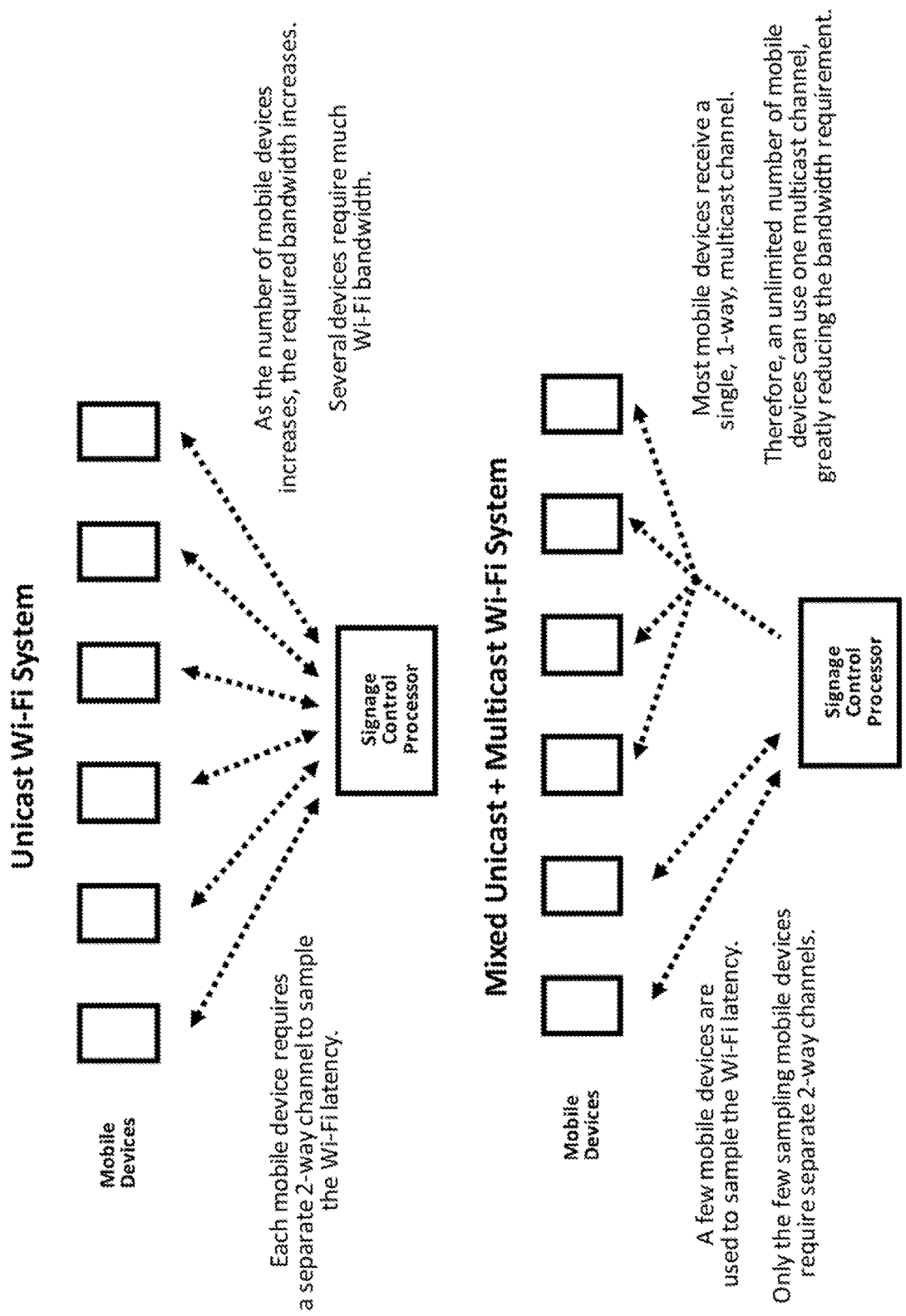
FIG. 3 is a schematic diagram showing a unicast approach compared to a hybrid unicast/multicast approach in accordance with various exemplary embodiments.

It should be noted that automatic synchronization is not limited to round-trip delay and time-stamping. Other delay measurement and automatic synchronization techniques may be used to set an initial time delay and/or make incremental adjustments to account for variations over time. Additionally, in some exemplary embodiments, automatic synchronization can use a "hybrid" unicast/multicast approach in which latency is measured for a subset of mobile devices using individual unicast communication connections (i.e., measuring delay for each of these mobile devices), determining a common delay to use for multicast communication with other mobile devices. FIG. 3 is a schematic diagram 300 showing a unicast approach (top) compared to a hybrid unicast/multicast approach (bottom) in accordance with various exemplary embodiments. In the unicast approach, unicast communication channels are established for all of the mobile devices for individual latency measurements and adjustments, which can be acceptable for a small number of mobile devices but can become overly burdensome to the system when there are a large number of mobile devices, e.g., due to bandwidth demands. In the hybrid approach, unicast communication channels are established for a small subset of mobile devices for individual latency measurements and adjustments for those mobile devices, and those individual latency measurements are used to determine a common delay (e.g., by taking an average) to use for multicast communication with other mobile devices, thereby limiting the amount of bandwidth needed for supporting a large number of mobile devices. The common delay might not be perfect for each mobile device but generally is acceptable across those mobile devices, e.g., to substantially synchronize outputs on the mobile devices with information being displayed on the digital signage display.

FIG. 4 is a schematic diagram 400 describing audio/video synchronization control in accordance with various exemplary embodiments. In such exemplary embodiments, the digital signage system uses two separate communication channels, one for audio content distribution from the signage control processor to the signage control app running on the mobile device and one for audio control distribution to provide audio synchronization information by the signage control processor to the signage control app (e.g., an amount of delay that should be added to the audio content by the signage control app, a latency measurement from which the signage control app can compute an amount of delay to be added to the audio content, timestamps, etc.). Here, the signage control processor 102 receives audio and video content, e.g., from the provider network 120 or from another source (which can include information stored by the signage control processor 120 itself). The audio and video content is generally in the form of a combined audio/video file or stream. The signage control processor 120 also can receive control commands and other data from the provider network 120, such as information for controlling how the audio and video content is handled by the signage control processor 120 and information regarding a particular mobile device or user that is connected with the signage control processor 120. The signage control processor 120 displays video information on the digital signage display 103 and optionally also provides corresponding audio information to the digital signage display 103 or related systems, e.g., for rendering through speakers associated with the digital signage display 103. The signage control processor 102 also provides audio information to the signage control app running on the mobile device 105 for rendering through an audio output of the mobile device in accordance with the audio control information in a manner that that substantially synchronizes the rendered audio information with the displayed video information, e.g., by adding delay to the video information displayed on the digital signage display 103 and having the signage control app add delay to the audio information if needed to perform such synchronization. For voice interaction with the digital signage system, the signage control app captures user voice signals from a microphone of the mobile device 105 and transmits voice control information (which represent user initiated commands) to the signage control processor 102 based on the user voice signals. The signage control processor 102 or other element of the digital signage system determines a user voice control command based on the voice control information and controls operation of the digital signage system based on the user voice control command and the video information displayed on the digital signage display, wherein the user voice control command is substantially synchronized with the video information being displayed on the digital signage display. As discussed herein, the signage control app also can capture other types of user control inputs (e.g., motion inputs or inputs made through the mobile phone touchscreen) and transmit additional control information to the signage control processor 102 for further interaction with the digital signage system.

In practice, the mobile devices must be able to recover from various types of error conditions, most typically lost audio packets, but also other error conditions such as audio packets that arrive too late or that arrive out-of-order.

In order to deal with the issue of lost packets, each audio sample may be sent in two or more independent packets for redundancy. For example, each audio packet may be transmitted in duplicate. As long as one of the packets arrives at the mobile device in time to be played in synchronization with the corresponding video, the mobile device can play the audio information. If the mobile device receives an audio packet too late for the audio packet to be played, the mobile device typically just ignores or discards the audio packet.

Additionally or alternatively, sequence numbers may be included in the audio packets so that the mobile devices can detect if an audio packet has been missed or if audio packets have arrived out-of-order (in which case the packets can be re-ordered into the correct sequence). If duplicate audio packets are transmitted as described immediately above, the sequence number would generally be the same for both duplicate packets.

In the event that one or more audio packets has been missed or packets are not received in time to synchronize with the video (i.e., there is a gap in the audio information received by the mobile device), the mobile device typically injects one or more "dummy" packets to fill the gap left by the missing packet(s). An injected packet may contain no audio data or may contain "dummy" data such as a small level of white noise to match the perceived volume and audio frequency of the surrounding audio (i.e., the audio information received before and perhaps after the missing packet) or audio data interpolated or extrapolated from the surrounding audio data (i.e., the audio information received before and perhaps after the missing packet).

In an exemplary embodiment, the application in the mobile device may be configured to manage the audio packets using a circular buffer. Received packets are placed appropriately into the circular buffer, and "dummy" packets are injected into the circular buffer as needed. Generally speaking, the circular buffer needs to accommodate audio data for at least the amount of time the video is delayed. In situations where the amount of audio delay is variable, the application in the mobile device may make automatic adjustments over time as discussed above. Typically, the application in each mobile device maintains a target delay that represents the combination of such factors as the amount of delay requested by the user, network variations that induce loss or latency changes, and slight variations in the analogto-digital and digital-to-analog conversion clocks on the server and client respectively. As discussed above, the delay may be adjusted automatically from time to time to compensate for variable network delay. Actual delay may only be measured periodically and with a large (but uniform) error in a user-mode application, so an exponential moving average may be used to predict the true delay with minimal hysteresis. The client then discards packets or injects dummy packets appropriately to match the predicted true delay to the target delay, within a given tolerance.

In certain exemplary embodiments, communication between the signage control processor 102 and the mobile devices 105 may utilize universal datagram packets (UDP) over an 802.11 wireless network. A combination of broadcast and host-to-host packets are used to organize the network, transmit audio data, and measure network latency. The server typically broadcasts its IP address to all subnet IP addresses periodically, and if a client mobile device is on the subnet, it will receive the server broadcast and can initiate communication with the server. As discussed above, each client may periodically send beacon packets to the server to indicate that the client still is participating in the network. In certain embodiments, the server aggregates client information and includes this information in the beacon, so clients may initiate their own peer-to-peer connection on the subnet without the assistance of the server. The server typically sends audio data as PCM samples which are compressed using the DEFLATE algorithm (gzip implementation). The compression allows scaling the audio stream to different bit-levels of precision without changing the protocol, as the compression will eliminate bits that do not carry information.

In some exemplary embodiments described above, only the audio signal is sent to the mobile devices. In various alternative embodiments, however, both the audio and video signals may be sent to some or all of the mobile devices (the user may be able to choose whether to receive only audio or both audio and video, perhaps for additional cost to receive the video), and the mobile device is configured to synchronize both the audio and video to the video displayed on the separate display device. Such functionality may be useful, for example, to allow the user to continue viewing the video even when away from the separate device or when viewing of the separate display device is obstructed.

It should be noted that embodiments can provide for different audio streams to be provided to different mobile devices, e.g., some users may want English language, some users may want Spanish language, etc. This could be done, for example, by allowing the person to select from multiple available audio channels, by the system automatically selecting the audio stream based on user identity/preferences, or in some other way.

In any of the embodiments described herein, an application running on the mobile device may be configured to detect that the mobile device is within range of the wireless sound channels being transmitted by the system and may automatically select a sound channel (e.g., a default sound channel that provides a menu of other selectable sound channels and/or services) or generate an alert to the user (e.g., a ring tone, a vibration, an icon on the mobile device display screen, a menu of available sound channels, etc.) upon which the user can select a sound channel by voice command or touching the mobile device screen. A menu of available sound channels may include, for example, sound channel numbers, video screen numbers, TV channel numbers, sound channel topics, and/or other information allowing the user to identify the sound channel and/or video associated with the sound channel. For example, a menu might just list the categories of videos currently being displayed (e.g., news, weather, ice hockey, pre-season baseball, playoff basketball, college basketball tournament, etc.) and the server identifies the selected sound channel based on the user's selection from the menu.

Furthermore, the server can correlate user activities with a corresponding user or user account. For example, a user may order food or drinks from an interactive menu as discussed above, and the server may automatically add the cost to the user's tab, e.g., identified based on the user's mobile device. In some cases, the server may be able to locate the user based on the location of the user's mobile device (e.g., based on GPS, proximity detection, etc.) and therefore may direct where the user's order is delivered, e.g., to a particular booth, table, or bar seat; to a patio; poolside to a particular table or lounge chair; in a casino to a particular game table or slot machine; at an entertainment venue (e.g., to a particular pool table or bowling lane), etc.

It should be noted that the signage control processor 102 may be configured to allow for simultaneously connecting to multiple mobile devices, e.g., to allow multiple people to provide voice control to the system and/or to allow multiple people to receive audio or other outputs from the system (e.g., allowing multiple people to listen to audio generated by the system).

It should be noted that signage control processors of the types described herein can be used for voice input/control of a variety of other display-based devices. For example, without limitation, such signage control processors could be used for ATMs, self-service kiosks, self-order kiosks, information kiosks, Internet kiosks, wayfinding kiosks, "smart" appliances, media players (e.g., juke boxes in public places), etc.

Without limitation, one example of interaction between a mobile device with signage control "app" and signage control processor might go something like this. The person approaches the system, detection occurs, and communication is established between the signage control "app" and the signage control processor. Information is displayed on the digital signage display, which may be generic (e.g., not geared toward any particular person) or may be personalized (e.g., "Hello, Jim, here are some items we have on sale today that might be of interest to you based on your preferences or recent activities such as browser history or locations"). Rather than using the digital signage display touchscreen to navigate and select, the person speaks into the mobile device to navigate and select. The signage control processor may provide audio back to the mobile device that the user can hear through the private earpiece of the mobile device. The signage control processor may provide information to the signage control "app" for display on the mobile device (e.g., a screen containing private information, or a screen through which the person can enter private information), and the signage control "app" may transmit information entered by the person to the signage control processor (e.g., private information entered by the person). The signage control "app" may be configured to act as a proxy between the signage control processor and the mobile device's Internet connectivity to allow the signage control processor to communicate with a remote server or system such as for voice recognition of audio received from the signage control "app," for accessing a user profile to obtain user preferences, for obtaining personalized information to convey to the person (e.g., through the digital signage display, through the mobile device display, through return audio, etc.), for providing user inputs to the server or system such as for ordering products, etc. For example, the signage control processor may submit Internet access requests to the signage control "app," which in turn may perform the Internet access and return results to the signage control processor.

With reference again to FIG. 4, it should be noted that the signage control processor 102 can be configured to process the source audio content (e.g., received from the provider network 120 or other source) for audio cues or triggers (e.g., word, phrase, audible or inaudible signal, etc.) that can be used to control operation of the digital signage system, thereby allowing control of the digital signage system via the source audio content, which may be, for example, a pre-recorded audio/video program or even could be a live or simulated person speaking to the user. Without limitation, such control can include generation of menus and options for the user to select, prompting the user to provide a voice or other input, stopping the video to await an input from the user, prompting the system to obtain up-to-date information to present to the user (e.g., "show today's deals" might prompt the signage control processor 102 to access a remote server obtain today's deals and even could use the mobile device or user identification as part of the search criteria to obtain specific deals for the user, such that the source content does not have to change in order to provide dynamic and even personalized information to the user), etc. Thus, for example, the signage control processor 102 can process audio information in both directions, i.e., audio information from the source content as well as audio information received from the signage control app and control the system accordingly.

Similarly, it should be noted that the signage control app running on the mobile device 105 can be configured to process the source audio content received from the signage control processor for audio cues or triggers (e.g., word, phrase, audible or inaudible signal, etc.) that can be used to control operation of the mobile device, e.g., triggering display of information on the mobile device display screen, triggering an Internet search, triggering a digital voice assistant such as ALEXA™ or SIRI™ triggering some other action (e.g., if the signage control app was configured to detect a specific audible or inaudible signal, then the source audio content and/or the signage control processor could include such signals in the audio information in order to trigger an action by the signage control app), etc. As mentioned above, in this way, the source content does not have to change in order to provide dynamic and even personalized information to the user.

In some cases, audio generated through a loudspeaker of the digital signage system could be used to trigger a digital voice assistant via the user's mobile device, e.g., if the audio included something like "Alexa, show me local deals," then this audio could be picked up by the user's mobile device and trigger the ALEXA™ digital voice assistant to show local deals, or if the signage control app was configured to detect a specific audible or inaudible signal, then the source audio content and/or the signage control processor could include such signals in the audio information in order to trigger an action by the signage control app.

It should be noted that terms such as "computer," "set top box," "phone," "smartphone," "router," and "modem" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A digital signage control system for control of a digital signage system through interaction from a mobile device, the digital signage control system comprising:
   a digital signage display interface;
   at least one wireless communication interface; and
   at least one processor coupled to at least one memory containing instructions executable by the at least one processor to cause the system to:
   establish one or more wireless communication connections between the digital signage control system and a signage control application running on a user mobile device via the at least one wireless communication interface;
   display video information on a digital signage display of the digital signage system via the digital signage display interface for interaction by a user of the user mobile device;
   transmit, to the signage control application running on the mobile device, over at least one of the one or more wireless communication connections, audio information associated with the video information for rendering through an audio output of the mobile device in synchronization with the displayed video information;
   receive, from the signage control application, voice control information based on user voice signals captured by the signage control application from a microphone of the user mobile device;
   determine a user voice control command based on the voice control information;
   control operation of the digital signage system based on the user voice control command and the video information displayed on the digital signage display, wherein the user voice control command is synchronized with the video information being displayed on the digital signage display for interaction with said video information; and
   collect information about at least one of the user, the user mobile device, the audio information, the video information, the user voice control command, location, or interaction with the signage control application for providing to a marketing or other entity.

2. A system according to claim 1, wherein:
   the video information displayed on the digital signage display is delayed relative to corresponding audio information by a predetermined amount of delay greater than or equal to an amount of delay added to the audio information by the at least one of the one or more wireless communication connections so that the audio information is received by the signage control application at or before the corresponding video information is displayed on the display device; and the signage control application running on the mobile device adds delay to the audio information if needed to render the audio information in synchronization with the delayed video information being displayed on the digital signage display.

3. A system according to claim 1, wherein the one or more communication connections are automatically established when the mobile device running the signage control application is in communicative proximity with the digital signage control system.

4. A system according to claim 1, wherein multiple communication connection channels are established between the digital signage control system and the signage control application running on the user mobile device to carry different types of traffic.

5. A system according to claim 1, wherein the at least one processor includes a signage control processor that establishes the one or more wireless communication connections, displays the video information on the digital signage display, transmits the audio information, receives the voice control information, determines the user voice control command, controls operation of the digital signage system, and collects the information.

6. A system according to claim 1, wherein the at least one processor includes (a) a signage control processor that establishes the one or more wireless communication connections, transmits the audio information, receives the voice control information, determines the user voice control command, controls operation of the digital signage system, and collects the information and (b) a processor separate from the signage control processor that displays the video information on the digital signage display.

7. A system according to claim 1, wherein the signage control application running on the mobile device performs voice recognition on the user voice signals to interpret the user voice signals and wherein the voice control information transmitted by the signage control application includes non-voice data representative of the interpreted user voice signals.

8. A system according to claim 7, wherein the non-voice data comprises voice-to-text data.

9. A system according to claim 1, wherein the digital signage control system performs voice recognition on the voice control information.

10. A system according to claim 1, further comprising:
receiving, by the digital signage control system, from the signage control application running on the mobile device, non-voice user input information based on a non-voice user input received by the signage control application.

11. A system according to claim 10, wherein the non-voice user input comprises at least one of a motion input or a mobile device touchscreen input.

12. A system according to claim 1, further comprising:
transmitting, by the digital signage control system to the signage control application running on the mobile device, non-audio output information relating to the information displayed on the digital signage display for rendering on the mobile device.

13. A system according to claim 12, wherein the non-audio output information comprises information for display on a display screen of the mobile device.

14. A system according to claim 1, further comprising:
accessing, by the digital signage control system, Internet connectivity of the mobile device to perform Internet-related processing for at least one of determining the user voice control command or controlling operation of the digital signage system.

15. A system according to claim 1, wherein the user voice control command comprises at least one of a voice-based query, a voice-based selection of an item displayed on the digital signage display, or voice-based navigation of information displayed on the digital signage display.

16. A system according to claim 1, wherein the digital signage control system monitors the audio information for triggers and further controls operation of the digital signage system based on the triggers.

17. A computer program product comprising at least one tangible, non-transitory computer-readable medium having embodied therein for control of a digital signage system through interaction from a mobile device, which, when executed by at least one processor of a digital signage control system, causes the digital signage control system to perform processes comprising:
establishing one or more wireless communication connections between the digital signage control system and a signage control application running on a user mobile device via at least one wireless communication interface of the digital signage control system;
displaying video information on a digital signage display of a digital signage system via a digital signage display interface of the digital signage control system for interaction by a user of the user mobile device;
transmit, to the signage control application running on the mobile device, over at least one of the one or more wireless communication connections, audio information associated with the video information for rendering through an audio output of the mobile device in synchronization with the displayed video information;
receive, from the signage control application, voice control information based on user voice signals captured by the signage control application from a microphone of the user mobile device;
determine a user voice control command based on the voice control information;
control operation of the digital signage system based on the user voice control command and the video information displayed on the digital signage display, wherein the user voice control command is synchronized with the video information being displayed on the digital signage display for interaction with said video information; and
collect information about at least one of the user, the user mobile device, the audio information, the video information, the user voice control command, location, or interaction with the signage control application for providing to a marketing or other entity.

18. A computer program product comprising at least one tangible, non-transitory computer-readable medium having embodied therein for control of a digital signage system through interaction from a mobile device, which, when executed by at least one processor of a user mobile device, causes the user mobile device to perform processes comprising:
establishing one or more wireless communication connections between a signage control application running on the user mobile device and a digital signage control system;
receiving, by the signage control application running on the user mobile device, over at least one of the one or more wireless communication connections, audio information associated with video information displayed by the digital signage control system on a digital signage display of a digital signage system;

rendering the audio information through an audio output of the user mobile device in synchronization with the displayed video information;

transmitting, to the digital signage control system, voice control information based on user voice signals captured by the signage control application from a microphone of the user mobile device, the voice control information including a voice control command for controlling operation of the digital signage system based on the user voice control command and the video information displayed on the digital signage display, wherein the user voice control command is synchronized with the video information being displayed on the digital signage display for interaction with said video information; and transmitting information about at least one of the user, the user mobile device, or location for providing to a marketing or other entity.

19. A system according to claim 1, wherein the digital signage control system is part of the digital signage system.

20. A system according to claim 1, wherein the digital signage control system is separate from the digital signage system.

21. A system according to claim 1, wherein the audio information includes audio from an actual person.

22. A system according to claim 21, wherein the actual person is in communication with the user of the user mobile device over at least one of the one or more wireless communication connections.

23. A system according to claim 1, wherein the audio information includes audio from a virtual persona in communication with the user of the user mobile device.

24. A system according to claim 23, wherein the virtual persona is in communication with the user of the user mobile device over at least one of the one or more wireless communication connections.

25. A system according to claim 23, wherein the virtual persona includes a chatbot.

26. A system according to claim 1, wherein the audio information includes audio from a text-to-speech converter.

27. A system according to claim 1, wherein the audio information includes text for the user mobile device to convert to audio.

28. A system according to claim 1, wherein the audio information includes an audio or audio/video file.

29. A system according to claim 1, wherein the audio information includes private information.

30. A computer program product according to claim 17, wherein at least one of:

the one or more communication connections are automatically established when the mobile device running the signage control application is in communicative proximity with the digital signage control system; or multiple communication connection channels are established between the digital signage control system and the signage control application running on the user mobile device to carry different types of traffic.

31. A computer program product according to claim 17, wherein the processes further comprise:

performing voice recognition on the voice control information.

32. A computer program product according to claim 17, wherein the processes further comprise at least one of:

receiving, from the signage control application running on the mobile device, non-voice user input information based on a motion input, a mobile device touchscreen input, or other non-voice user input received by the signage control application;

transmitting, to the signage control application running on the mobile device, non-audio output information relating to the information displayed on the digital signage display for rendering on the mobile device;

accessing Internet connectivity of the mobile device to perform Internet-related processing for at least one of determining the user voice control command or controlling operation of the digital signage system; or monitoring the audio information for triggers and further controlling operation of the digital signage system based on the triggers.

33. A computer program product according to claim 17, wherein the user voice control command comprises at least one of a voice-based query, a voice-based selection of an item displayed on the digital signage display, or voice-based navigation of information displayed on the digital signage display.

34. A computer program product according to claim 17, wherein:

the audio information includes audio from an actual person or virtual persona.

35. A computer program product according to claim 18, wherein:

the video information displayed on the digital signage display is delayed relative to corresponding audio information by a predetermined amount of delay greater than or equal to an amount of delay added to the audio information by the at least one of the one or more wireless communication connections so that the audio information is received by the signage control application at or before the corresponding video information is displayed on the display device; and the signage control application running on the mobile device adds delay to the audio information if needed to render the audio information in synchronization with the delayed video information being displayed on the digital signage display.

36. A computer program product according to claim 18, wherein the one or more communication connections are automatically established when the mobile device running the signage control application is in communicative proximity with the digital signage control system.

37. A computer program product according to claim 18, wherein multiple communication connection channels are established between the digital signage control system and the signage control application running on the user mobile device to carry different types of traffic.

38. A computer program product according to claim 18, wherein the signage control application running on the mobile device performs voice recognition on the user voice signals to interpret the user voice signals and wherein the voice control information transmitted by the signage control application includes non-voice data representative of the interpreted user voice signals.

39. A computer program product according to claim 38, wherein the non-voice data comprises voice-to-text data.

* * * * *